(12) United States Patent
Kim

(10) Patent No.: US 8,330,310 B2
(45) Date of Patent: Dec. 11, 2012

(54) SPINDLE MOTOR WITH BEARING HOUSING AND BASE PLATE HAVING REVERSE BURRING PART

(75) Inventor: Chanseok Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 165 days.

(21) Appl. No.: 12/902,390

(22) Filed: Oct. 12, 2010

(65) Prior Publication Data

US 2011/0084575 A1    Apr. 14, 2011

(30) Foreign Application Priority Data

Oct. 12, 2009   (KR) .................. 10-2009-0096569

(51) Int. Cl.
*H02K 5/167*   (2006.01)
(52) U.S. Cl. ....................... 310/90; 310/67 R
(58) Field of Classification Search ............... 310/90, 310/67 R, 42, 425; *H02K 05/167*
See application file for complete search history.

(56) References Cited

U.S. PATENT DOCUMENTS

| | | | | |
|---|---|---|---|---|
| 6,339,275 B1 * | 1/2002 | Katagiri | .................. | 310/424 |
| 7,880,353 B2 * | 2/2011 | Kim et al. | .................. | 310/90 |
| 7,890,970 B2 * | 2/2011 | Iwai et al. | .................. | 720/707 |
| 7,915,774 B2 * | 3/2011 | Lee | .................. | 310/90 |
| 2007/0132326 A1 * | 6/2007 | Kim et al. | .................. | 310/90 |
| 2007/0257574 A1 * | 11/2007 | Kim et al. | .................. | 310/90 |
| 2008/0046906 A1 * | 2/2008 | Takaki et al. | .................. | 720/707 |
| 2008/0169709 A1 * | 7/2008 | Lee | .................. | 310/42 |

FOREIGN PATENT DOCUMENTS

JP   2002-084707 A   3/2002
KR   10-2007-0007517 A   1/2007

* cited by examiner

*Primary Examiner* — Hanh Nguyen
*Assistant Examiner* — Naishadh Desai
(74) *Attorney, Agent, or Firm* — Saliwanchik, Lloyd & Eisenschenk

(57) ABSTRACT

A spindle motor is disclosed. The spindle motor includes a rotation shaft; a bearing rotatedly supporting the rotation shaft inserted therein; a bearing housing supporting the bearing and coupled to a stator; and a base plate coupled to the bearing housing, wherein the base plate has a reverse burring part projected from an upper part of the base plate along the outer surface of the bearing housing and burred from the upper surface of the bearing housing towards the lower surface opposite to the upper surface to support the outer surface of the bearing housing.

11 Claims, 3 Drawing Sheets

«SPINDLE MOTOR WITH BEARING HOUSING AND BASE PLATE HAVING REVERSE BURRING PART

CROSS-REFERENCE TO RELATED APPLICATION

This application claims the benefit under 35 U.S.C. §119 of Korean Application No. 10-2009-0096569, filed Oct. 12, 2009, which is hereby incorporated by reference in its entirety.

BACKGROUND OF THE INVENTION

1. Field of the Invention

The present invention relates to an optical disk spindle motor employed in a laptop computer or a portable terminal.

2. Description of the Related Art

A spindle motor is installed in the inner side of an ODD (Optical Disk Drive) to rotate an optical disk for recording or reading a data.

The spindle motor encompasses a rotation shaft, a stator including a bearing rotatedly fixing a rotation shaft and a bearing housing receiving the bearing and a rotor having a rotating shaft rotated with respect to the stator, and the stator may be fixed to a base plate.

The base plate has a burring part projected by a burring process and a burring hole formed at the burring part to fix the bearing housing.

An outer surface of the bearing housing is inserted by pressure into the burring part of the base plate through the burring hole, wherein when a bearing housing is coupled to the burring part, the bearing housing may be inclinedly coupled with respect to a base plate or damage can be done to the bearing housing.

In a case the bearing housing is inclinedly coupled with respect to the base plate, a rotation shaft also is slantly disposed, resultantly causing a fatal drawback.

BRIEF SUMMARY

Devised to improve such described disadvantages, the present invention provides a spindle motor to prevent an assembly fault of a bearing housing and a base plate.

A spindle motor of the present invention is provided as one embodiment of a turn-table configured to receive a disk, including a rotation shaft; a bearing rotatably supporting the rotation shaft inserted therein; a bearing housing supporting the bearing and coupled to a stator; and a base plate coupled to the bearing housing, wherein the base plate has a reverse burring part projected from an upper part of the base plate along the outer surface of the bearing housing and burred from the upper surface of the bearing housing towards the lower surface opposite to the upper surface to support the outer surface of the bearing housing.

DETAILED DESCRIPTION

Figure 1:
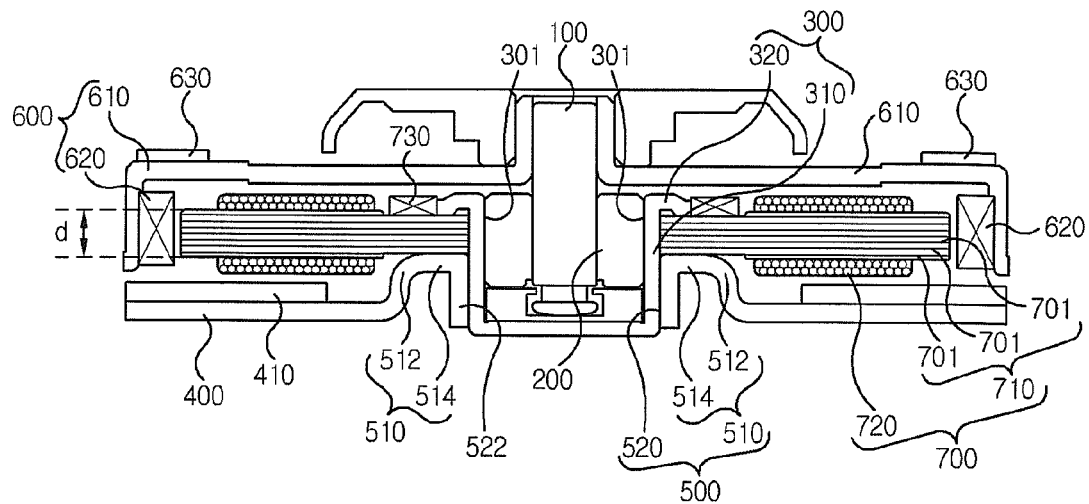
FIG. 1 is a cross-sectional view illustrating an entire structure of a spindle motor according to one embodiment of the present invention.

FIG. 1 is a cross-sectional view illustrating an entire structure of a spindle motor according to one embodiment of the present invention.

The present invention includes a rotation shaft 100, a bearing 200, a bearing housing 300, a base plate 400, and a reverse burring part 500.

A rotor 600 is fixed to a rotation shaft 100 to integrally rotate with the rotation shaft 100, and the rotor 600 includes a rotor yoke 610 mounting an optical disk (hereinafter, not shown) and a plurality of permanent magnet 620 mounted on the inner surface of the rotor yoke 610.

A felt 630 of ring shape is mounted on the rotor yoke 610 mounting the optical disk, and by means of the felt 630, the optical disk does not slip against the rotor yoke 610. The felt 630 may include elastic material.

A bearing 200 rotatably supports the rotation shaft 100, and the bearing has a pipe shape with a hollow.

A bearing housing 300 is formed of a cylindrical shape opened in the upper part, and the bearing housing 300 includes an opening part 301. An inner part of the bearing housing receives the bearing 200.

A stator 700 described later is coupled to the outer surface of the bearing housing 300.

A base plate 400 is provided to fix the bearing housing 300, and a circuit substrate 410 electrically connected to a coil of a stator 700 is disposed on the upper surface.

The base plate 400 has a reverse burring part 500. A part of the reverse burring part 500 is projected towards a later described core from the base plate 400, and the reverse burring part 500 is projected towards the lower surface opposite to the upper surface of the base plate 400 where the circuit substrate 410 is formed to support the outer surface of the bearing housing 300.

The reverse burring part 500 projected from the base plate 400 decreases the weight and vibration of the rotor 600 and the stator 700 including the bearing housing 300.

The reverse burring part 500 projected from the base plate 400 enhances a coupling force of the bearing housing 300 and the base plate 400.

Because the reverse burring part 500 is formed in a way to be easily inserted from the upper surface of the base plate 400 to the lower surface thereof, damage to a bearing housing can be prevented in a coupling to the bearing housing.

Referring to FIGS. 1 to 4, the bearing housing 300 includes a body 310 and a flange 320, wherein the bearing housing 300 serves to fix the bearing 200 rotatedly supporting the rotation shaft 100.

The body 310 is formed of a cylindrical shape opened in the upper part to accept the bearing 200, and the body 310 includes an opening 310 inserting the bearing 200.

The flange 320 extends toward outside of the body 310 along edges of the body 310. The flange 320 prevents a breakaway of the stator 700.

The stator 700 includes a core 710 and a coil 720. The core 710 is coupled to the outer surface of the bearing housing 300, and the core 710 is formed by stacking field magnet plates 701 having a plurality of arm radially formed.

The coil 720 wires surrounding the arm, and the coil 720 is electrically connected to the circuit substrate 410.

A thickness d of the core 710 is substantially the same as a distance between the reverse burring part 500 and the flange 320 of the bearing housing 300.

On the upper surface of the core 710, an absorption magnet 730 is disposed, and the absorption magnet 730 faces the rotor yoke 610.

The absorption magnet 730 keeps the rotor yoke 610 from floating from the core 710 when the rotor yoke 610 rotates along with the rotation shaft 100.

Figure 2:
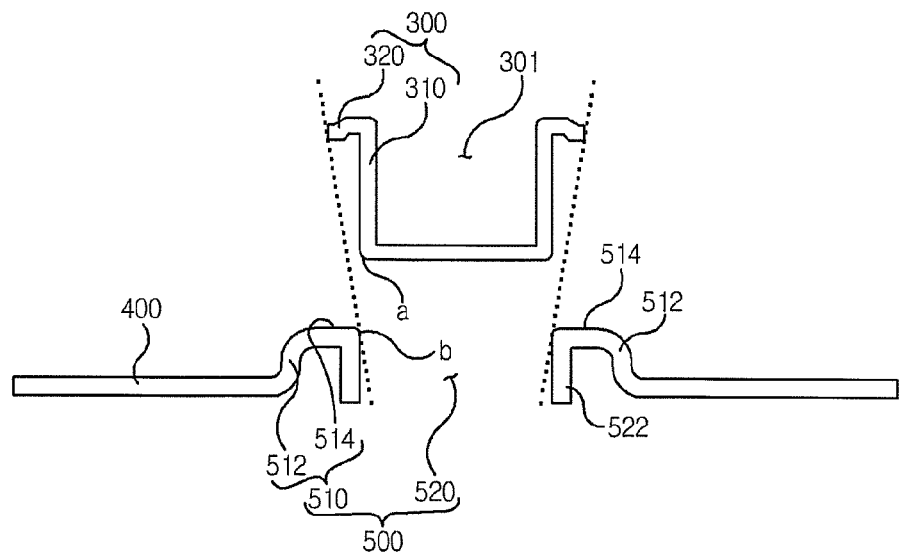
FIG. 2 is a cross-sectional view illustrating a bearing housing and a base plate coupled to the bearing housing.
Figure 3:
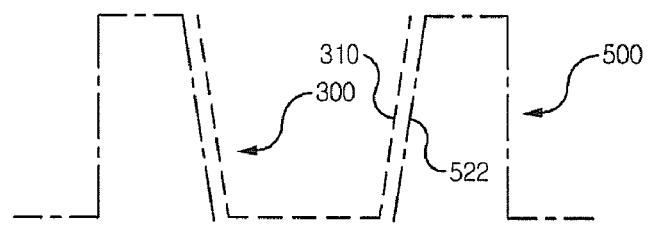
FIG. 3 is a cross-sectional view illustrating a shape of a bearing housing and a shape of a base plate.

Referring to FIG. 2, a reverse burring part 500, which is coupled to outside surface of the bearing housing 300, includes a burring part 522 in which a core support part 510 and a burring hole 520 are formed.

The core support part 510 is projected from the upper surface of the base plate 510 to serve as a support of the core 710 of the stator 700.

The burring part 522 is formed by a burring process, wherein the burring part 522 is formed from the upper surface of the base plate 400 towards the lower surface opposite to the upper surface of said base plate 400, and the burring hole 520 is formed by the burring part 522.

The core support part 510 includes a round part 512 and a core contact part 514 contacting with the stator 700.

The core support part 514 is disposed at a higher position than the upper surface of the base plate, and the core contact part 514 is formed in parallel to the upper surface of the base plate 400.

The round part 512 connects the core contact part 514 to the upper surface of the base plate 400, and the round part 12 distributes weight of the stator 700 disposed on the core contact part 514 and vibrations occurring from the rotor 600 rotating along with the rotation shaft 100.

The inner side surface of the burring part 522 is formed in a substantially vertical direction from the core contact part 514 to the base plate 400, and the inner surface of the burring part 522 is inserted by pressure into the outer surface of the bearing housing 300.

The burring part 522 substantially supports the bearing housing 300, and because the burring part 522 is formed in a direction from the upper surface of the base plate 400 towards the lower surface, the lower end of the bearing housing 300 may be easily inserted into the burring part 522.

The diameter of the burring part 522 becomes narrower as proceeding from the upper end of the burring part 522 proximate to the core contact part 514 into the lower end opposite to the upper end of the burring part 522, and for this reason, the burring part 522 is formed in a tapered shape.

Also, the diameter of the bearing housing 300 becomes narrower as proceeding from the upper end where the flange 320 is formed into the lower end opposite to the upper end of the burring part 522, so that the bearing housing 300 is formed in a tapered shape. The body 310 of the bearing housing 300 is processed in a tapered shape by a drawing process.

The inner side surface of the burring part 522 is processed in a tapered shape starting from the core contact part 514 to its lower part by the burring process.

In one embodiment of the invention, a bearing housing 300 and a burring part 522 form a taper in the same direction. Thus, in a case the body 310 of the bearing housing 300 is coupled to the burring part 522 of a base plate 400, when a bottom plate edge (a) of the bearing housing 300 is inserted into an edge (b) formed by the encountering of the burring part 522 and the core contacting part 522 of a core support part 510, the bearing housing 300 may be easily coupled to the burring part 522.

Thus, bonding material of a uniform amount may be poured between the body 310 and the burring part 522 to prevent an excessive consumption of the bonding material.

Also, when the body 310 of the bearing housing 310 is coupled to the burring part 522 of a reverse burring part 520, the base housing 300 being inclinedly coupled against the base plate 400 can be prevented.

Figure 4:
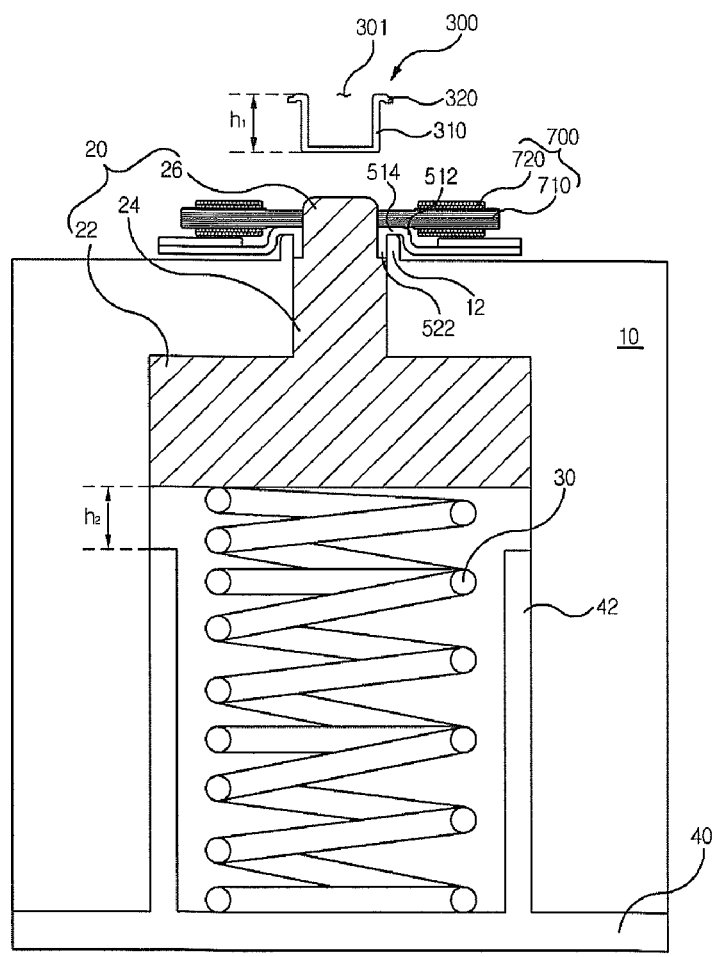
FIGS. 4 and 5 are cross-sectional views illustrating an assembling process of a base plate to a bearing housing.
Figure 5:
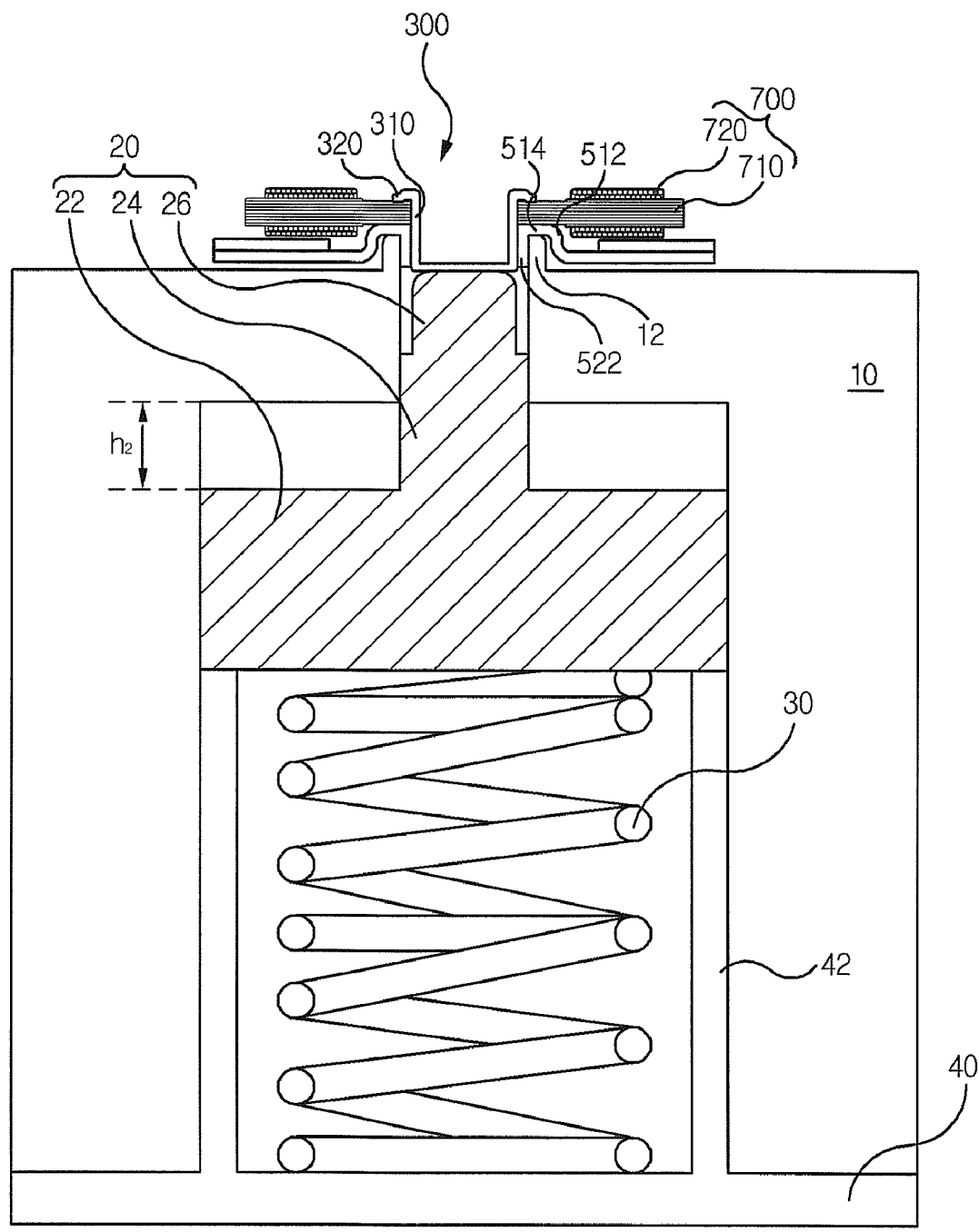

Referring to FIGS. 4 and 5, a reverse burring part 500 is installed in a worktable 10 having a ring jig 12 corresponding to the shape of a core contact part 514 and a burring part 522, the reverse burring part 500 may be coupled to a bearing housing 300 in a swift and accurate manner by means of a centering member 20 supported by a spring 30 for round-trip elevating.

A centering member 20 includes a base part 22 round-trip shifting along the inner part space of the worktable 10, a guide part 24 projected from the base part 22 and a protrusion part 26 that is projected from the guide part 24 and temporarily fixes a core 710 of a stator 700 reeled by a coil 720.

First, a contact part 522 is in a fixed and centered state between the inner surface of the ring jig 12 and the outer surface of the protrusion part 26, and the base part 22 is supported by the spring 30, and the spring 30 is safely received on a substrate 40 finishing the bottom surface of the worktable 10.

A joining pole 42 is projected from the substrate 40 that is connected to the worktable 10, and the end part and base part 22 of the joining pole 42 are separated by a certain distance $h_2$ all the time by the spring 30 in a normal state.

The distance $h_2$ corresponds to a height $h_1$ above from the flange 320 of the bearing housing 300 to the end part of the body 310.

Therefore, when an operator contacts the end part of the body 310 into the protrusion part 26 to place pressure thereon, the centering member 20 descends down by naturally the height $h_1$, that is a separated distance $h_2$ of the end part of the joining pole 42 and the base part 22, and a joining of the body 310 and the contact part 522 is completed.

At this time, the bearing housing 300 manufactures the end part surface of the opposite side of its opening part 301 flatly to contact the protrusion part 26 to be smoothly inserted into the contact part 522.

As described above, the present invention shows its basic technical spirit as providing a spindle motor that can minimize noise and vibrations and enhance the durability of an apparatus, and capable of minimizing a fault occurrence and able to minimize a waste of unnecessary material.

While embodiments according to the present invention have been described above, these are only by way of example and it would be understood by those skilled in the art that any embodiment of various modifications and equivalents can be made thereto.

Thus, the genuine technical scope of the present invention should be defined from the accompanying claims.

What is claimed is:

1. A spindle motor, comprising:
   a rotation shaft;
   a bearing rotatably supporting the rotation shaft;
   a bearing housing supporting the bearing and coupled to a stator; and
   a base plate coupled to the bearing housing,
   wherein the base plate has a reverse burring part projected from an upper part of the base plate along the outer surface of the bearing housing and burred from the upper surface of the bearing housing towards the lower surface opposite to the upper surface to support the outer surface of the bearing housing, and
   wherein the stator includes:
      a core stacked with field magnet plates. wherein the field magnet plates include a plurality of arms radially formed around the rotation shaft, and
      a coil wire surrounding the arms by multiple times, wherein a thickness of the core corresponds to a distance between the reverse burring part and an end part of the bearing housing.

2. The spindle motor of claim 1, wherein the stator is accommodated on the reverse burring part.

3. The spindle motor of claim 1, wherein the bearing housing includes:
 a body having a cylindrical shape to accept the bearing; and
 a flange extending outside from an end part of the body to fix the upper surface of the stator, wherein the stator is fixed to the outer surface of the body.

4. The spindle motor of claim 3, further comprising an absorption magnet disposed in the stator along edges of the flange, wherein the absorption magnet faces a rotor yoke mounted on an end part of the rotation shaft.

5. A spindle motor, comprising:
 a rotation shaft;
 a bearing rotatably supporting the rotation shaft:
 a bearing housing supporting the bearing and coupled to a stator; and
 a base plate coupled to the bearing housing,
 wherein the base plate has a reverse burring part projected from an upper part of the base plate alone the outer surface of the bearing housing and burred from the upper surface of the bearing housing towards the lower surface opposite to the upper surface to support the outer surface of the bearing housing, and
 wherein the reverse burring part includes:
  a core contact part projected from the base plate; and
  a burring hole formed by a burring part burred towards an opposite direction of an opening part of the bearing housing,
  wherein the stator is fixed between the core contact part and an end part of the bearing housing.

6. The spindle motor of claim 5, wherein the spindle motor is rounded from the core contact part to the surface of the base plate, and the burring part is formed perpendicularly to the core contact part.

7. The spindle motor of claim 5, wherein the burring part is tapered off from the core contact part to an end part of the burring part, and the bearing housing is tapered from an open part of the bearing housing to the opposite direction, and
 wherein the bearing housing is fixed to the burring part through a core contact part of the reverse burring part by an opposite end part of the opening part.

8. The spindle motor of claim 5, wherein the stator is accommodated on the reverse burring part.

9. The spindle motor of claim 5, wherein the bearing housing includes:
 a body having a cylindrical shape to accept the bearing; and
 a flange extending outside from an end part of the body to fix the upper surface of the stator, wherein the stator is fixed to the outer surface of the body.

10. The spindle motor of claim 9, further comprising an absorption magnet disposed in the stator along edges of the flange, wherein the absorption magnet faces a rotor yoke mounted on an end part of the rotation shaft.

11. The spindle motor of claim 5, wherein the stator includes:
 a core stacked with field magnet plates, wherein the field magnet plates include a plurality of arms radially formed around the rotation shaft, and
 a coil wire surrounding the arms by multiple times,
 wherein a thickness of the core corresponds to a distance between the reverse burring part and an end part of the bearing housing.

\* \* \* \* \*